United States Patent [19]
Thompson et al.

[11] Patent Number: 5,934,971
[45] Date of Patent: Aug. 10, 1999

[54] FIBER OPTIC DEADMAN CONTROL

[75] Inventors: Bob Thompson, Sugarland; Phuong Nguyen, Stafford, both of Tex.

[73] Assignee: United States Filter Corporation, Palm Desert, Calif.

[21] Appl. No.: 08/958,836

[22] Filed: Oct. 28, 1997

[51] Int. Cl.$^6$ ........................................................ B24C 3/00
[52] U.S. Cl. .................................. 451/2; 451/102; 451/3; 451/38; 451/35; 451/90; 364/138; 385/19
[58] Field of Search .............................. 451/2, 3, 38, 75, 451/90; 364/138; 385/191

[56] References Cited

U.S. PATENT DOCUMENTS

| | | | |
|---|---|---|---|
| 4,306,314 | 12/1981 | Griffiths | 455/612 |
| 5,024,029 | 6/1991 | Abbott et al. | 451/2 |
| 5,110,189 | 5/1992 | Haines | 299/30 |
| 5,369,410 | 11/1994 | Reich | 342/175 |

Primary Examiner—David A. Scherbel
Assistant Examiner—George Nguyen
Attorney, Agent, or Firm—Wolf, Greenfield & Sacks, P.C.

[57] ABSTRACT

An emergency control system for selectively activating and deactivating an apparatus. The system includes a fiber optic transmitter for emitting radiation and a fiber optic receiver for receiving and measuring a wavelength and an intensity of the radiation. A manually-operated fiber optic switch is placed in optical communication with the fiber optic transmitter and the fiber optic receiver. In operation, the switch is selectively actuated, thereby selectively opening and closing a fiber optic circuit defined by the transmitter, receiver, and the switch. The system further includes a relay controller in communication with the fiber optic receiver, such that the relay controller is actuated when the fiber optic receiver receives a predetermined wavelength and intensity of radiation from the transmitter. When the relay controller is actuated, it allows a signal to pass through the relay to a point of use. In this manner, the operation of the fiber optic switch selectively controls the presence of the signal at the point of use, which can be a spring loaded solenoid valve or other electromechanical actuator capable of deactivating an apparatus.

40 Claims, 3 Drawing Sheets

5,934,971

FIBER OPTIC DEADMAN CONTROL

BACKGROUND OF THE INVENTION

1. Field of the Invention

The present invention is directed to a control system for selectively activating and deactivating an apparatus and, more specifically, to an emergency control system for deactivating an abrasive blast apparatus when an operator experiences emergency conditions.

2. Discussion of the Related Art

Various manually-operated devices benefit from the incorporation of emergency control systems therein that deactivate the device when an operator experiences emergency conditions. Maximum utility from the emergency control system is realized in a situation where feedback is desired when the operator becomes incapacitated (falls, faints, or the like) or otherwise becomes unable to properly operate the device. In many situations, the feedback is necessary to deactivate the device and/or to alert others of the situation. Devices in which emergency control systems have been incorporated include outboard and inboard marine engines, lawnmowers, pressurized abrasive blast systems, chainsaws, drill presses, ripsaws, and the like. Current federal regulations require emergency control systems on certain devices used in the workplace. In particular, Occupational Safety and Health Administration (OSHA) regulations require emergency control systems on all abrasive blast equipment used in the workplace.

For illustration, a prior art abrasive blast system 70 having an emergency control system 80 is shown in FIG. 1. Abrasive blast system 70 includes a compressed air supply 100, a blast media vessel 102, an air valve 104, a media metering valve 106, a blast hose 108, and a nozzle 109. In operation, compressed air supply 100 pressurizes blast media vessel 102. When air valve 104 and media metering valve 106 are opened, compressed air enters blast hose 108 to form a pressurized stream, and blast media is introduced to the pressurized stream by gravity to form a pressurized blast stream. The pressurized blast stream expands to atmospheric pressure through nozzle 109, thus hurling the blast media against a target at high velocity.

Emergency control system 80 includes a manual switch 110, supply lines 112, a control valve 114, and control lines 116. Control valve 114 is placed in fluid communication with air valve 104 and media metering valve 106 such that, when actuated, control valve 114 selectively allows or prevents compressed air from entering control lines 116 and actuating air valve 104 and media metering valve 106. In this manner, selective actuation of control valve 114 activates and deactivates abrasive blast system 70.

Conventional abrasive blast emergency control systems are either pneumatically or electrically operable. A pneumatic emergency control system includes a selectively open and closed path defined by switch 110, supply lines 112 (hoses), and control valve 114. In operation, an operator depresses switch 110 which, depending on the particular configuration employed, opens or closes the pneumatic path. When switch 110 is depressed, control valve 114 is placed in a position that activates abrasive blast system 70. When the operator releases switch 110, which is spring loaded, control valve 114 is placed in a position that deactivates abrasive blast system 7.

An electrical emergency control system includes a selectively open and closed electrical circuit defined by switch 110, supply lines 112 (wires), and control valve 114, which is a spring loaded electrical solenoid. In operation, the operator depresses switch 110 which closes the electrical circuit, energizes valve 114, and activates abrasive blast system 70. When released, switch 110 opens the circuit, which de-energizes valve 114 and deactivates abrasive blast system 70.

Both emergency control systems have advantages and disadvantages in particular applications. Pneumatic controls are dependable but, depending on the length of supply lines 112, have relatively slow response times. The response time in a typical abrasive blast system having over two-hundred feet of blast hose and four hundred feet of supply line can be several seconds. Furthermore, supply lines 112 in pneumatic systems are usually formed of rubber hoses which add undesirable bulk to the system. Electrical controls are less bulky than pneumatic controls. However electrical controls are prone to wear in a hostile blasting environment, and where certain explosive atmospheric conditions are present, exposed electrical switches are prohibited at a point of use.

SUMMARY OF THE INVENTION

Accordingly, the present invention is directed to a reliable control system and method for selectively activating and deactivating an apparatus under any conditions. The present invention is especially useful for quickly deactivating the apparatus when an operator experiences emergency conditions. Further advantages of the present invention include its light weight and its safety in explosive environments relative to electrical systems.

The system includes a fiber optic transmitter for emitting radiation and a fiber optic receiver for receiving and measuring a wavelength and an intensity of the radiation. A manually-operated fiber optic switch is placed in optical communication with the fiber optic transmitter and the fiber optic receiver. In operation, the switch is selectively opened and closed, thereby selectively opening and closing a fiber optic circuit defined by the transmitter, the receiver, and the switch. The system further includes a relay controller in communication with the fiber optic receiver, such that the relay controller is actuated when the fiber optic receiver receives the radiation from the transmitter. When the relay controller is actuated, it controls the passage of a signal to a point of use at an apparatus. In this manner, the operation of the fiber optic switch selectively controls the presence of the signal at the point of use, which can be a solenoid valve or other electromechanical actuator capable of deactivating the apparatus when an operator experiences an emergency condition.

In another embodiment, the present invention provides an emergency control system kit for assembly in the field. The kit includes pre-packaged system components such as a fiber optic transmitter, receiver, and switch, along with a prepackaged relay controller. The components are adapted for on-site assembly, and assembly instructions can also be provided with the kit when necessary.

In another embodiment, the present invention is directed to an abrasive blast system including a pressurized fluid supply and a media vessel capable of receiving pressurized blast media therein. The pressurized fluid supply is placed in fluid communication with the media vessel to pressurize the vessel. A fluid valve is provided in fluid communication with the pressurized fluid supply for directing fluid through the abrasive blast system. A blast hose in fluid communication with both the fluid valve and the vessel directs a pressurized fluid media stream to a point of use. A fiber optic emergency control system capable of selectively actuating the abrasive blast system is also provided. Optionally, the abrasive blast system can include a media metering valve in fluid communication with the blast hose and a control valve in communication with the fluid valve, the media metering valve, and the relay controller. When actuated by the fiber optic receiver, the relay controller allows a signal to pass to the control valve, which actuates the media metering valve and the fluid valve between an open position and a closed position. The abrasive blast system can further include a blast nozzle connected to an end of the blast hose for accelerating the pressurized fluid media stream as the stream leaves the blast hose.

The abrasive blast system can be provided with a venting system for releasing pressure in the blast hose during emergency conditions. The venting system includes a vent valve in fluid communication with the blast hose. The vent valve is positioned between the fluid valve and the media metering valve such that, when the vent valve is open, the pressurized fluid media stream exhausts through the vent valve. The vent valve can be placed in communication with the emergency control system such that, when actuated by the fiber optic receiver, the relay controller allows a signal to pass to the vent valve which moves between an open position and a closed position. Optionally, the venting system can include an energy absorber to absorb pressurized fluid media stream energy as the stream exhausts through the vent valve.

The present invention also provides a method of controlling an apparatus under various conditions, such as in an emergency situation. The method includes providing a fiber optic transmitter, a fiber optic receiver, a fiber optic switch, and a relay controller. The transmitter, receiver, and switch are placed in optical communication with each other, and the relay controller is placed in communication with the receiver. An operator of the apparatus manually actuates the switch, which selectively opens and closes a fiber optic circuit. Depending on the position of the switch, the relay controller will/will not allow a signal to pass to a point of use in the apparatus, thus activating or deactivating the apparatus.

BRIEF DESCRIPTION OF THE DRAWINGS

The foregoing and other advantages of the present invention will be more fully appreciated with reference to the following drawings in which.

DETAILED DESCRIPTION

The present invention is directed to a control system and method for quickly activating and deactivating an apparatus under various circumstances. In this regard, the system not only provides standard on/off operation, it also provides for rapid deactivation of the apparatus when an operator experiences emergency conditions. Apparatuses that may benefit from incorporation of the present invention include any system where instantaneous feedback is desired when the operator experiences emergency conditions. In many situations, the instantaneous feedback is necessary to deactivate the apparatus and/or to alert others of the situation. Emergency conditions can include situations where the operator becomes incapacitated (falls, faints, or the like), or otherwise becomes unable to properly operate the apparatus.

Figure 1:
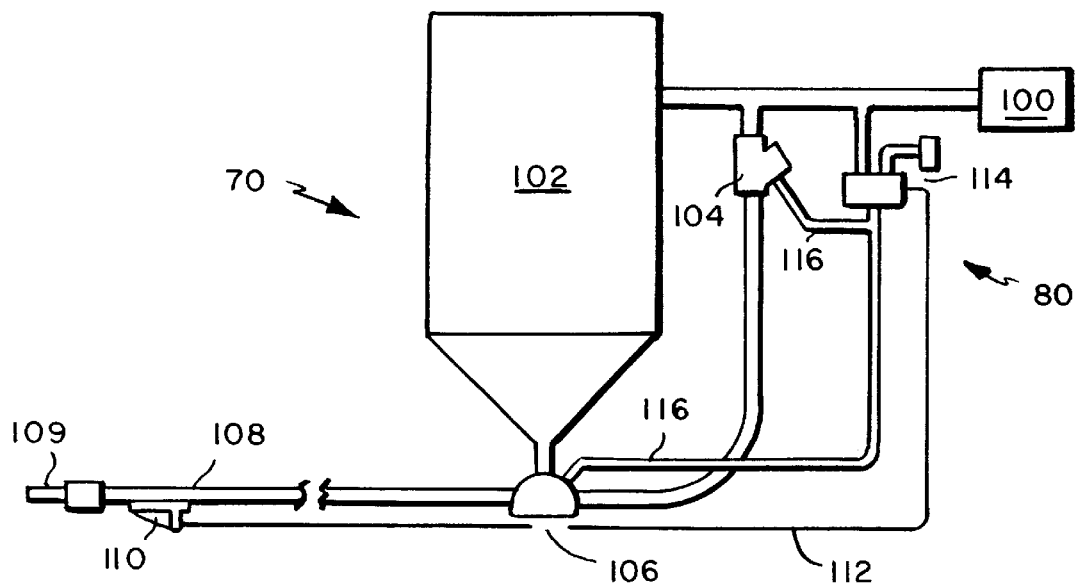
FIG. 1 is a schematic view of a prior art abrasive blast system having an emergency control system.
Figure 2:
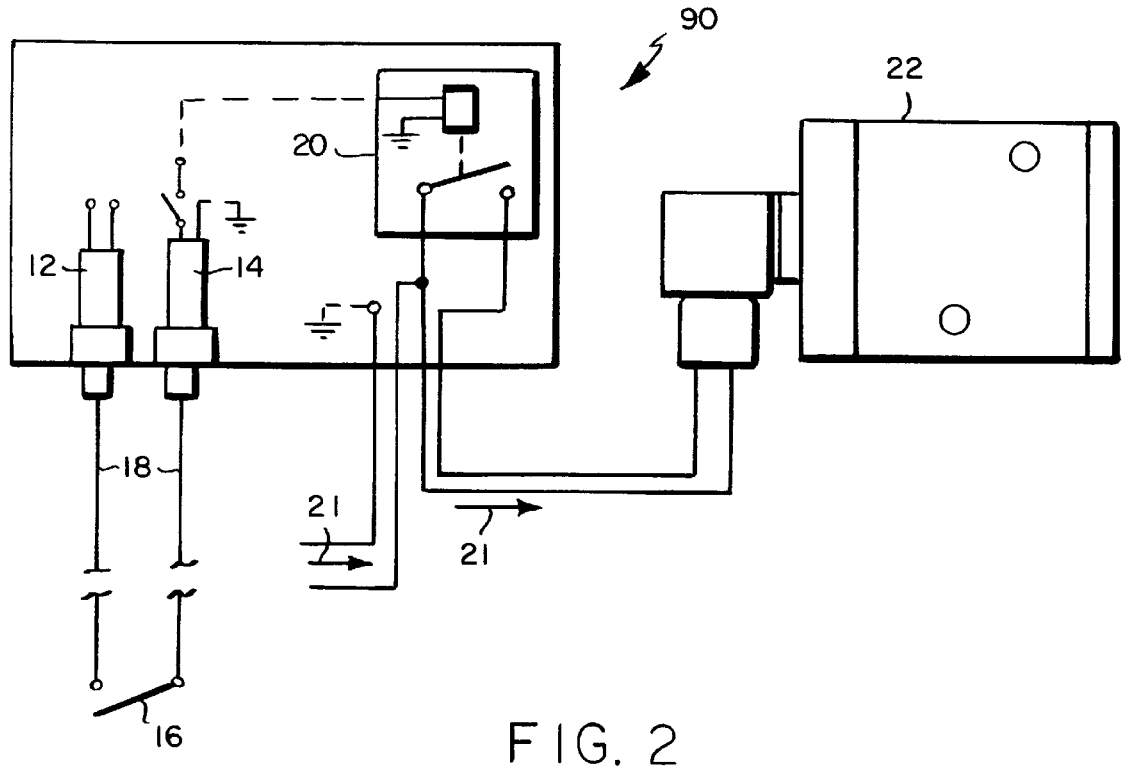
FIG. 2 is a schematic view of an embodiment of an emergency control system of the present invention.
Figure 3:
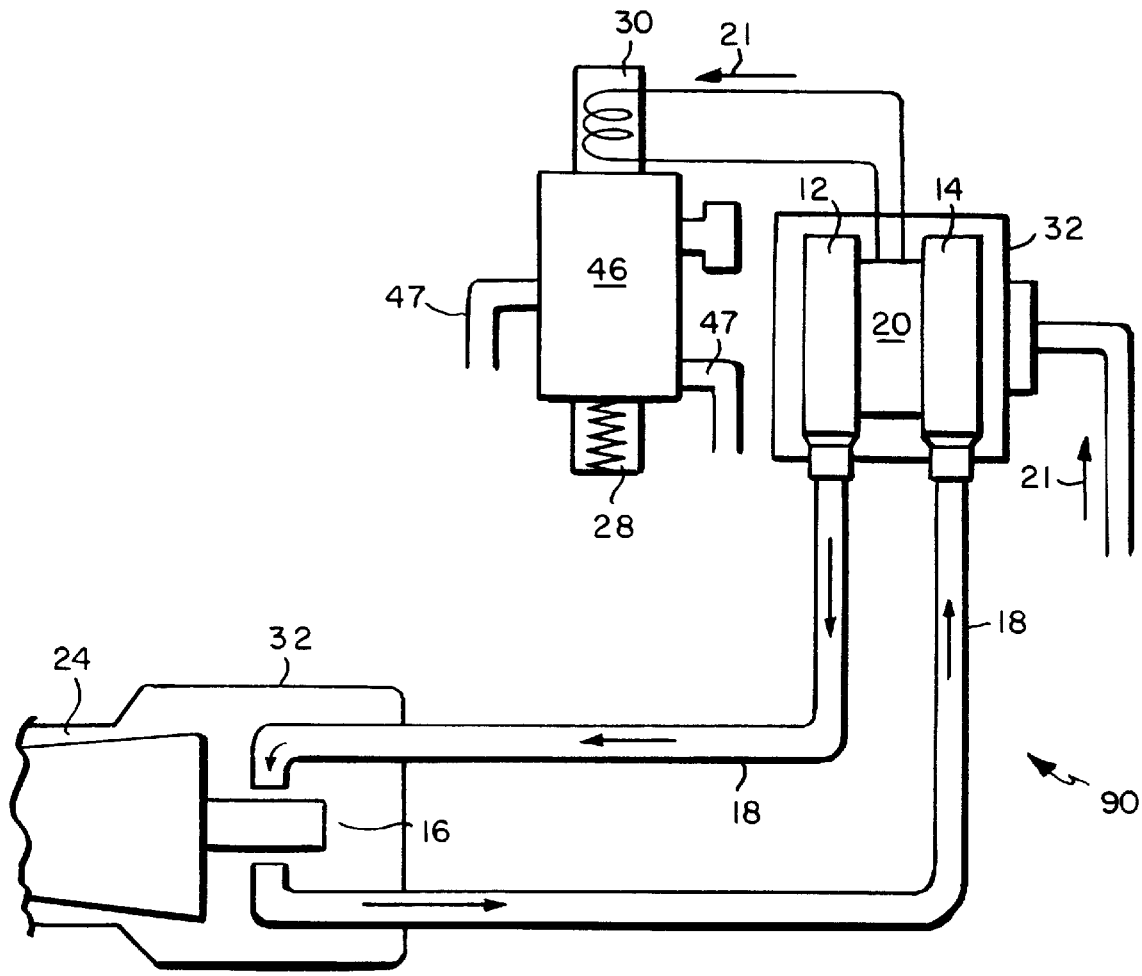
FIG. 3 is a schematic view of an alternative embodiment of an emergency control system of the present invention.

As shown in FIG. 2, an embodiment of an emergency control system 90 of the present invention includes a fiber optic transmitter 12 for emitting radiation and a fiber optic receiver 14 for receiving and measuring a wavelength and an intensity of the radiation. A manually-operated fiber optic switch 16 is placed in optical communication with fiber optic transmitter 12 and fiber optic receiver 14 through fiber optic cables 18. "Optical communication" between system components is defined as a situation in which an optical event taking place in one component is potentially capable of causing a reaction in the other component(s). In various circumstances, other items may be placed in the communication path between components in optical communication without disrupting the optical communication. For example, in the embodiment shown in FIG. 2, transmitter 12 and receiver 14 are in optical communication with each other notwithstanding the presence of switch 16 in the fiber optic circuit. In operation, switch 16 is selectively actuated, thereby selectively opening and closing a fiber optic circuit defined by transmitter 12, receiver 14, and switch 16.

Fiber optic transmitter 12 can be chosen from any commercially available transmitter or radiation emitter. For example, one acceptable transmitter is a Honeywell Model HFE 4836-013, available from Honeywell, Inc., Minneapolis, Minn. Likewise, fiber optic receiver 14 can be chosen from any commercially available receiver, sensor, or collector, which is capable of discriminating between radiation of differing wavelengths and/or intensities. For example, one such receiver is a Honeywell Model HFD 3880-002 receiver.

The radiation emitted by transmitter 12 and received by receiver 14 can be associated with changing electric and magnetic fields (i.e. electromagnetic radiation), such as that found in the infrared, visible, and ultraviolet portions of the electromagnetic spectrum. The amount of energy present in electromagnetic radiation depends on its wavelength and can be expressed by the following formula:

$$E = hc/\lambda$$

(where h is Planck's constant $=6.626 \times 10^{-34}$ Joule.sec, c is the speed of light $=2.998 \times 10^8$ m/sec, and $\lambda$ is the wavelength in meters). Based on this inverse relationship between electromagnetic energy and wavelength, transmitter 12 and receiver 14 can be chosen in combination such that receiver 14 responds only to the wavelength of radiation emitted by transmitter 12, and such that transmitter 12 emits radiation of a wavelength different from most other radiation sources that may be present in the operating environment.

Emergency control system 90 further includes a relay controller 20 in communication with fiber optic receiver 14. In this context, "communication" defines a situation in which relay controller 20 is actuated when fiber optic receiver 14 receives the predetermined wavelength and intensity of radiation from transmitter 12. When relay controller 20 is actuated, it controls the passage of a signal 21 (shown by arrows) to a point of use 22 at an apparatus (not shown). In this manner, the operation of the fiber optic switch selectively controls the presence of signal 21 at point of use 22 to selectively activate and deactivate the apparatus. Suitable relay controllers include, for example, solid-state relays, such as Texas Instruments Model TIP33A relays, available from Texas Instruments, Dallas, Tex.

In the embodiment shown in FIG. 2, signal 21 is an electrical signal produced by an electrical power source (not shown). However, an appropriate signal and signal source is selected in light of the discrete circumstances in a given application and can be, for example, pneumatic, hydraulic, and the like. Point of use 22 includes a device capable of deactivating the apparatus when emergency control system 90 is activated. Accordingly, point of use 22 can include a pneumatic valve, a hydraulic valve, a spring-loaded electrical solenoid valve, an electromechanical actuator, and the like, depending on the nature of the apparatus and the tasks necessary to deactivate the apparatus.

Figure 4:
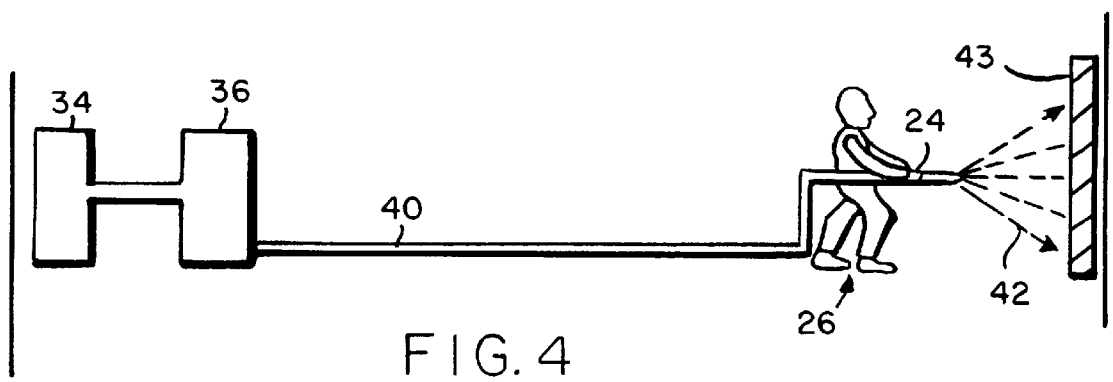
FIG. 4 is a schematic view of an embodiment of an abrasive blast system having an emergency control system of the present invention in operation.
Figure 5:
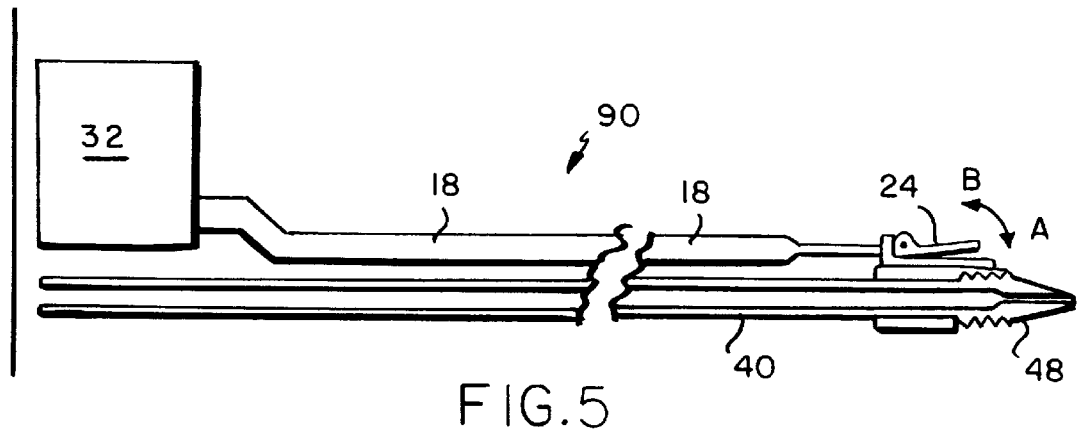
FIG. 5 is a schematic view of an embodiment of an abrasive blast system having an emergency control system of the present invention.

Emergency control system 90 can be provided with a handle 24 (shown in FIGS. 3, 4, 5, and 6) capable of being grasped by an operator 26 (shown in FIG. 4). Handle 24 and switch 16 can be connected, so that operator 26 can selectively actuate the system by depressing or releasing (as shown by arrows A and B in FIG. 5) handle 24, which can be spring-loaded to automatically return to released position 30 when force is removed. Depending on whether signal 21 is used to activate or deactivate the apparatus, handle 24 and switch 16 can be adapted to close the fiber optic circuit when depressed and to open the fiber optic circuit when released, or to close the fiber optic circuit when released and to open the fiber optic circuit when depressed. Optionally, handle 24 can be provided with a safety reset button (not shown) that must be depressed before the handle can be depressed.

Optionally, emergency control system 90 can include one or more enclosures 32 to house the system components and to prevent contaminants, such as dust, water, and corrosive chemicals, from entering. One or more of enclosures 32 can be formed of an opaque material, such as an opaque plastic, to prevent unwanted radiation from sources other than transmitter 12 from affecting the fiber optic circuit.

Emergency control system 90 can be provided in kit form, which includes prepackaged system components adapted for on-site assembly in the field. The packaging material is selected to be sturdy and otherwise physically suitable for storing and transporting fiber optic equipment, such that no physical, chemical, or electromagnetic contaminants damage the equipment while in transit. Assembly instructions can be included with the kit.

Figure 6:
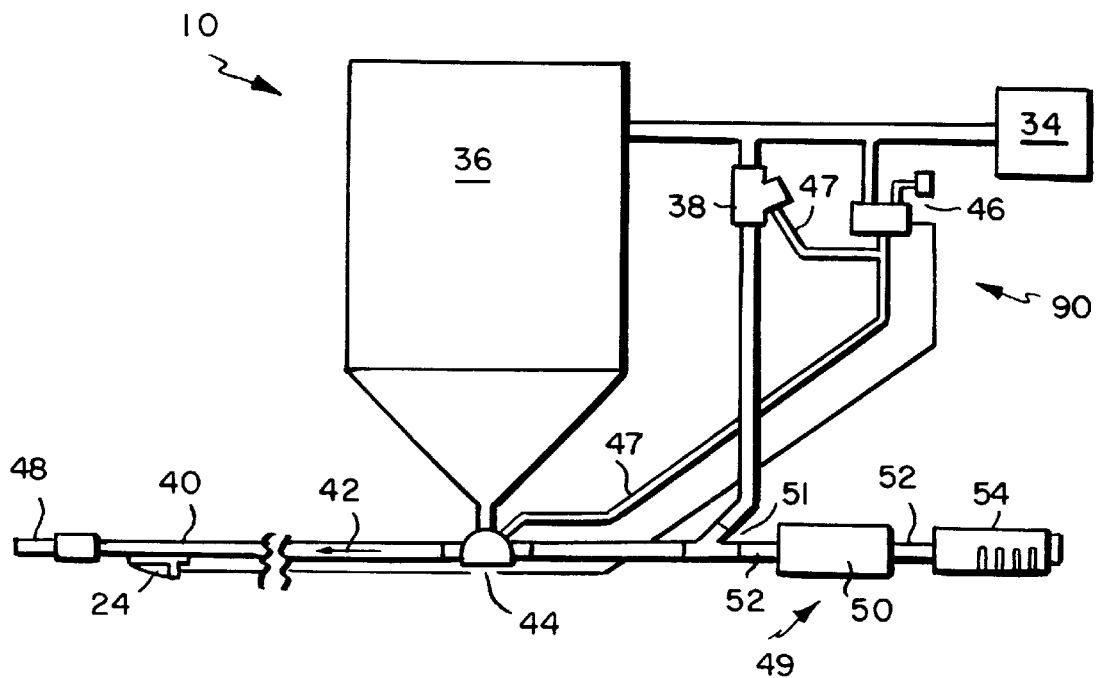
FIG. 6 is a schematic view of an embodiment of an abrasive blast system having an emergency control system of the present invention.

With reference to FIGS. 4 and 6, an alternative embodiment of the present invention is directed to an abrasive blast system 10 including a pressurized fluid supply 34 and a media vessel 36 capable of receiving pressurized blast media therein. Pressurized fluid supply 34 is placed in fluid communication with media vessel 36 to pressurize the vessel. "Fluid communication," as used herein, means connected in a manner that allows fluidized flow therebetween. "Fluid" includes any substance, such as a liquid or gas, that is capable of flowing and that changes its shape at a steady rate when acted upon by a force. As used herein, "fluid" can include a pressurized air stream carrying blast media. Pressurized fluid supply 34 can be any apparatus capable of supplying fluid at a pressure above the ambient pressure in the working environment. Depending on the application, suitable pressurized fluid supplies include steady-state air compressors and intermittent air compressors with storage tanks. Blast media selection is based on discrete circumstances in a particular application and can include sand, steel pellets, glass pellets, plastic pellets, and the like.

Media vessel 36 can be formed of any rigid material capable of withstanding the pressure produced by pressurized fluid supply 34 and can be skid mounted or otherwise portable, as required. Media vessel 36 can have a single-chamber or double-chamber configuration. In operation, both chambers of a double-chamber vessel are initially filled with blast media and then pressurized. As the blasting operation proceeds, the media in the upper chamber flows into the lower chamber. When the transfer is completed, the upper chamber is depressurized for refilling, while the lower chamber remains pressurized for blasting. Thus, a double-chamber configuration allows continuous blasting without interruption to refill the media vessel. Media vessel 36 can also be provided with a media storage hopper (not shown) or a vacuum media loading system (not shown) to allow bulk supply of blast media for subsequent use. Suitable media vessels and accessories are available from U.S. Filter/Schmidt, Fresno, Tex.

A fluid valve 38 is provided in fluid communication with pressurized fluid supply 34 for directing fluid through abrasive blast system 10. Fluid valve 38 acts as an "on/off switch" for blast system 10 and can be selected from any conventional valve configuration, including guillotine-type, flange-type, pinch-type, and the like. A blast hose 40 is provided in fluid communication with both fluid valve 38 and media vessel 36 to direct a pressurized fluid media stream 42 (arrow) to a blast surface 43. When filled with blast media, media vessel 36 can be pressurized by pressurized fluid supply 34 to a pressure substantially the same as the rest of blast system 10. Media vessel 36 can be positioned above a portion of blast hose 40 such that blast media can enter hose 40 by gravity to produce pressurized fluid media stream 42.

Optionally, abrasive blast system 10 can include a media metering valve 44 in fluid communication with blast hose 40 for controlling the quantity of blast media introduced into pressurized fluid media stream 42. Suitable media metering valves are available from U.S. Filter/Schmidt, Fresno, Tex.

If a pneumatic pressure supply is used, moisture may adversely affect blast media flow in abrasive blast system 10. Specifically, media can accumulate or "clump" in metering valve 44 causing it to fail. Furthermore, wet media can accumulate in the bottom of media vessel 36, thus retarding or preventing media flow into blast hose 40. Therefore, abrasive blast system 10 can also include a water separator (not shown) for removing unwanted moisture from the pressure supply to the blast system 10.

Abrasive blast system 10 can further include a blast nozzle 48 (shown in FIGS. 5 and 6) connected to an end of blast hose 40 for accelerating pressurized fluid media stream 42 as it leaves the hose. The acceleration is the result of the relative orifice sizes of blast hose 40 (larger) and blast nozzle 48 (smaller), and can be further increased by providing a venturi in blast nozzle 48. Preferably blast nozzle 48 is formed of a highly abrasive-resistant material, such as silicon nitride, although tungsten carbide, silicon carbide, and other art-recognized abrasive resistant materials can be used. Suitable nozzles are available from U.S. Filter/Schmidt, Fresno, Tex.

Fiber optic emergency control system 90 (as described above with reference to FIG. 2) capable of selectively actuating abrasive blast system 10 is incorporated the blast system. Furthermore, blast system 10 can include a control valve 46 in communication with fluid valve 38, media metering valve 44, and relay controller 20 (shown in FIG. 2) such that, when actuated by fiber optic receiver 14, relay controller 20 allows signal 21 to pass to control valve 46. In this regard, control valve 46 (shown in FIGS. 3 and 6) corresponds to point of use 22 (shown in FIG. 2). Optionally, a control valve 46 can be a spring-loaded solenoid having an electromagnetic coil 30 and a return spring 28. When control valve 46 receives signal 21, it selectively actuates media metering valve 44 and fluid valve 38 between an open position and a closed position, thus activating or deactivating abrasive blast system 10 in response to the position of manually-operated fiber optic switch 16. Control valve 46 can be connected to media metering valve 44 and fluid valve 38 through fluid lines 47, such that control valve 46 actuates the other valves by varying the pressure in the fluid lines.

In addition, abrasive blast system 10 can include a venting system 49 for releasing pressure in blast hose 40 during emergency conditions. With reference to FIG. 6, venting system 49 includes a vent valve 50 in fluid communication with blast hose 40 through a fitting 51, positioned between fluid valve 38 and media metering valve 44, and a vent port 52. Preferably, fitting 51 is a "Y" fitting, a "T" fitting, or other fitting having three discrete openings. Preferably, the diameter of vent port 52 is substantially larger than the diameter of blast nozzle 48 to provide a path of least resistance for pressurized fluid media stream 42 when vent valve 50 is open. The relative sizing and positioning of venting system 49 induces pressurized fluid media stream 42 to exhaust through venting system 49 instead of blast nozzle 48 when blast system 10 is suddenly deactivated.

Vent valve 50 can be placed in communication with emergency control system 90 such that, when actuated by fiber optic receiver 14, relay controller 20 allows signal 21 to pass to vent valve 50, thus allowing it to move between an opened position and a closed position. In this configuration, emergency control system 90 can nearly simultaneously deactivate abrasive blast system 10 and activate venting system 49 when operator 26 experiences emergency conditions.

Optionally, venting system 49 can include an energy absorber 54 to absorb pressurized fluid media stream energy as it exhausts through vent valve 50. Energy absorber 54 is capable of controlling the discharge of pressurized fluid media stream 42 in a safe manner while allowing the release of pressure from blast hose 40. In this regard, energy absorber 54 can be a partially enclosed container formed of abrasive-resistant material, and can be positioned relative to vent port 52 such that the bulk of pressurized fluid media stream 42 strikes a portion of energy absorber 54 not having openings.

It will be understood that each of the elements described above or two or more together may also find utility in other applications different from those described above. While the invention has been illustrated and described as embodied in an abrasive blast system, it is not intended to be limited to the details shown, since various modifications and substitutions may be made without departing in any way from the spirit of the present invention. Such modifications and substitutions may include using the emergency control system in recreational marine equipment, lawn maintenance equipment, heavy construction equipment, and the like. Further modifications and equivalents of the invention herein disclosed will occur to persons skilled in the art using no more than routine experimentation, and all such modifications and equivalents are believed to be within the spirit and scope of the invention as defined by the following claims.

What is claimed is:

1. An emergency control system for selectively activating and deactivating an apparatus, said emergency control system comprising:
    a) a fiber optic transmitter for emitting radiation having a wavelength and an intensity;
    b) a fiber optic receiver for receiving and measuring the wavelength and the intensity of the radiation;
    c) a manually-operated fiber optic switch in optical communication with the fiber optic transmitter and the fiber optic receiver for selectively opening and closing a fiber optic circuit; and
    d) a relay controller in communication with the fiber optic receiver such that the relay controller is actuated when the fiber optic receiver receives the radiation thereby controlling the passage of a signal to a point of use at the apparatus.

2. The emergency control system of claim 1, wherein the signal that passes to the point of use when the relay controller is actuated is an electrical signal.

3. The emergency control system of claim 2, wherein the point of use comprises a spring-loaded solenoid for performing a mechanical task when the electrical signal is received from the relay controller.

4. The emergency control system of claim 3, wherein the mechanical task includes selectively actuating a pneumatic valve.

5. The emergency control system of claim 1, wherein the apparatus comprises a handle capable of being grasped by an operator of the apparatus, the handle being in communication with the manually-operated fiber optic switch such that the apparatus is deactivated when the operator experiences an emergency condition.

6. The emergency control system of claim 1, further comprising a first enclosure for housing the fiber optic transmitter, the fiber optic receiver, and the relay controller therein.

7. The emergency control system of claim 6, further comprising a second enclosure for housing the fiber optic switch therein.

8. The emergency control system of claim 7, wherein the enclosures are formed of opaque plastic to prevent unwanted radiation from affecting the fiber optic circuit.

9. An emergency control system kit for assembly in the field, said kit comprising:
    a) a pre-packaged fiber optic transmitter capable of emitting radiation having a wavelength and an intensity;
    b) a pre-packaged fiber optic receiver capable of receiving and measuring the wavelength and the intensity of the radiation;
    c) a pre-packaged manually-operated fiber optic switch capable of being placed in optical communication with the fiber optic transmitter and the fiber optic receiver for selectively opening and closing a fiber optic circuit; and
    d) a pre-packaged relay controller capable of being placed in communication with the fiber optic receiver such that the relay controller is actuated when the fiber optic receiver receives the radiation, thereby controlling the passage of a signal to a point of use at an apparatus to selectively activate and deactivate the apparatus.

10. The kit of claim 9, further comprising instructions for assembly of the emergency control system in the field.

11. The kit of claim 9, wherein the signal that passes to the point of use when the relay controller is installed and actuated is an electrical signal.

12. The kit of claim 11, wherein the point of use comprises a spring-loaded solenoid for performing a mechanical task when the electrical signal is received from the relay controller.

13. The kit of claim 12, wherein the mechanical task includes selectively actuating a pneumatic valve.

14. The kit of claim 9, wherein the apparatus comprises a handle capable of being grasped by an operator of the apparatus, the handle being in communication with the manually-operated fiber optic switch of the assembled system such that the apparatus is deactivated when the operator experiences an emergency condition.

15. The kit of claim 9, further comprising a first enclosure adapted for housing the fiber optic transmitter, the fiber optic receiver, and the relay controller therein.

16. The kit of claim 15, further comprising a second enclosure adapted for housing the fiber optic switch therein.

17. The kit of claim 16, wherein the enclosures are formed of opaque plastic to prevent unwanted radiation from affecting the fiber optic circuit when assembled.

18. An abrasive blast system comprising:
   a) a pressurized fluid supply;
   b) a media vessel capable of receiving pressurized blast media therein in fluid communication with the pressurized fluid supply;
   c) a fluid valve in fluid communication with the pressurized fluid supply for directing fluid through the system;
   d) a blast hose in fluid communication with the fluid valve and the vessel for directing a pressurized fluid media stream to a point of use; and
   e) an emergency control system for selectively actuating the fluid valve, the emergency control system comprising:
      i) a fiber optic transmitter for emitting radiation having a wavelength and an intensity;
      ii) a fiber optic receiver for receiving and measuring the wavelength and the intensity of the radiation;
      iii) a manually-operated fiber optic switch in optical communication with the fiber optic transmitter and the fiber optic receiver for selectively opening and closing a fiber optic circuit; and
      iv) a relay controller in communication with the fiber optic receiver such that the relay controller is actuated when the fiber optic receiver receives the radiation, thereby controlling the passage of a signal to the fluid valve to selectively activate and deactivate the abrasive blast system.

19. The abrasive blast system of claim 18, wherein the media vessel further comprises a media metering valve in fluid communication with the blast hose.

20. The abrasive blast system of claim 19, further comprising a control valve in communication with the fluid valve, the media metering valve, and the relay controller such that when actuated by the fiber optic receiver the relay controller allows a signal to pass to the control valve allowing the control valve to actuate the media metering valve and the fluid valve between an open position and a closed position.

21. The abrasive blast system of claim 18, further comprising a blast nozzle connected to an end of the blast hose for accelerating the pressurized fluid media stream as the stream leaves the blast hose.

22. The abrasive blast system of claim 21, further comprising a venting system for releasing pressure in the blast hose during emergency conditions, the venting system comprising a vent valve in fluid communication with the blast hose, the vent valve being positioned in the abrasive blast system between the fluid valve and the media metering valve such that when the vent valve is open the pressurized fluid media stream exhausts through the vent valve.

23. The abrasive blast system of claim 22, wherein the vent valve is in communication with the emergency control system such that when actuated by the fiber optic receiver the relay controller allows a signal to pass to the vent valve allowing the vent valve to move between an open position and a closed position.

24. The abrasive blast system of claim 22, wherein the venting system further comprises an energy absorber to absorb pressurized fluid media stream energy as the stream exhausts through the vent valve.

25. The abrasive blast system of claim 20, wherein the signal that passes to the control valve when the relay controller is actuated is an electrical signal.

26. The abrasive blast system of claim 25, wherein the control valve includes a spring-loaded solenoid for performing a mechanical task when the electrical signal is received from the relay controller.

27. The abrasive blast system of claim 26, wherein the mechanical task includes selectively actuating a pneumatic valve.

28. The abrasive blast system of claim 21, wherein the abrasive blast system further comprises a handle capable of being grasped by an operator, the handle being in communication with the manually-operated fiber optic switch such that the abrasive blast system is deactivated when the operator experiences an emergency condition.

29. The abrasive blast system of claim 18, wherein the emergency control system further comprises a first enclosure for housing the fiber optic transmitter, the fiber optic receiver, and the relay controller therein.

30. The abrasive blast system of claim 29, wherein the emergency control system further comprises a second enclosure for housing the fiber optic switch therein.

31. The abrasive blast system of claim 30, wherein the enclosures are formed of opaque plastic to prevent unwanted radiation from affecting the fiber optic circuit.

32. A method of controlling an apparatus, said method comprising the steps of:
   a) providing a fiber optic transmitter for emitting radiation having a wavelength and an intensity;
   b) providing a fiber optic receiver for receiving and measuring the wavelength and the intensity of the radiation;
   c) providing a relay controller in communication with the fiber optic receiver such that the relay controller is actuated when the fiber optic receiver receives the radiation, thereby controlling the passage of a signal to a point of use at the apparatus; and
   d) manually actuating a fiber optic switch in optical communication with the fiber optic transmitter and the fiber optic receiver such that the fiber optic switch selectively opens and closes a fiber optic circuit.

33. The method of claim 32, wherein the apparatus is an abrasive blast system.

34. The method of claim 32, wherein the signal that passes to the point of use when the relay controller is actuated is an electrical signal.

35. The method of claim 34, wherein the point of use comprises a spring-loaded solenoid for performing a mechanical task when the electrical signal is received from the relay controller.

36. The method of claim 35, wherein the mechanical task includes selectively actuating a pneumatic valve.

37. The method of claim 32, wherein the apparatus comprises a handle capable of being grasped by an operator of the apparatus, the handle being in communication with the manually-operated fiber optic switch such that the apparatus is deactivated when the operator experiences the emergency condition.

38. The method of claim 32, further comprising housing the fiber optic transmitter, the fiber optic receiver, and the relay controller within a first enclosure.

39. The method of claim 38, further comprising housing the fiber optic switch within a second enclosure.

40. The method of claim 39, wherein the enclosures are formed of opaque plastic to prevent unwanted radiation from affecting the fiber optic circuit.

\* \* \* \* \*